United States Patent [19]

Grigsby, Jr.

[11] Patent Number: 4,716,193
[45] Date of Patent: Dec. 29, 1987

[54] REACTIVE GLASS COMPONENT IN RIM

[75] Inventor: Robert A. Grigsby, Jr., Georgetown, Tex.

[73] Assignee: Texaco, Inc., White Plains, N.Y.

[21] Appl. No.: 892,237

[22] Filed: Aug. 4, 1986

[51] Int. Cl.$^4$ ............................................. C08G 18/00
[52] U.S. Cl. .................................... 524/730; 528/28; 528/48
[58] Field of Search .................... 524/730; 528/28, 48

[56] References Cited

U.S. PATENT DOCUMENTS

| | | | |
|---|---|---|---|
| 3,523,918 | 8/1970 | Quillery | 260/2.5 |
| 4,218,543 | 8/1980 | Weber et al. | 521/51 |
| 4,246,363 | 1/1981 | Turner et al. | 521/163 |
| 4,269,945 | 5/1981 | Vanderhider et al. | 521/159 |
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |
| 4,474,900 | 10/1984 | Dominguez | 521/110 |
| 4,582,887 | 4/1986 | Dominguez et al. | 528/48 |
| 4,585,850 | 4/1986 | Dominguez | 528/122 |
| 4,607,090 | 8/1986 | Dominguez | 528/48 |

OTHER PUBLICATIONS

Dow–Corning Publication "Silane Coupling Agents," pp. 1–34, 1981.
Ad & Spe Sheet on Glassclad ® 18, Petrarch Systems.
Foley, John, Surfactants, pp. 46–47, *Plastics Engineering*, May 1978.
Schwartz et al., "Silane Effects and Machine Processing in Reinforced High Modulus RIM Urethane Composites," *J. Elas. & Plastics*, vol., 11, 280–299, Oct. 1979.
Galli, Ed, "Surface Modification for RRIM Urethanes," *Plastics Compounding*, Jan./Feb. 1982.

*Primary Examiner*—Maurice J. Welsh
*Attorney, Agent, or Firm*—Jack H. Park; Kenneth R. Priem

[57] ABSTRACT

The invention is a reinforced reaction injection molded elastomer made by reacting in a closed mold amine terminated polyethers of greater than 1500 average molecular weight, having greater than 50% of their active hydrogens in the form of amine hydrogens, a chain extender, an aromatic polyisocyanate, a filler and an effective amount of a silane having the formula:

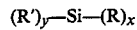

$$(R')_y\text{—Si—}(R)_x$$

where $x+y=4$; $R'$ is a hydrophobic moiety and $R$ is an alkoxy group, preferably methoxy or ethoxy.

4 Claims, No Drawings

REACTIVE GLASS COMPONENT IN RIM

BACKGROUND OF THE INVENTION

1. Field of the Invention

This invention concerns the field of reaction injection molded elastomers.

Reaction injection molded elastomers make excellent molded parts useful, for example, in the automobile industry as exterior parts for vehicles.

2. Description of Related Publications

U.S. Pat. Nos. 4,396,729; 4,444,910 and 4,433,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives.

U.S. Pat. No. 4,585,850 concerns and claims a reaction injection molded elastomer made by reacting in a closed mold amine terminated polyethers of greater than 1500 average molecular weight, having greater than 50% of their active hydrogens in the form of amine hydrogens, a chain extender, flaked glass pretreated with amino silane coupling agent, and an aromatic polyisocyanate. The '850 patent referred to above contains a discussion of other applications and patents in the field and is incorporated herein by reference.

Included in the discussion in the '850 patent are U.S. Pat. Nos. 4,474,900, 4,582,887 and Ser. No. 763,502 filed Aug. 8, 1985 which will issued as U.S. Pat. No. 4,607,090 on Aug. 19, 1986 relate to various types of glass fillers in RIM. The disclosures of these are also incorporated herein by reference.

An article in *Plastics Engineering* (May 1978) by John Foley of Witco Chemical Corp. discusses the use of surfactants as internal mold release agents.

Quillery's U.S. Pat. No. 3,523,918 describes the use of amine chain extenders for the preparation of integral skin foams. Also, Weber, et al's. U.S. Pat. No. 4,218,543 describes the use of high molecular weight polyols, certain aromatic diamines and isocyanates for the production of RIM parts. This Bayer patent specifically claims as a chain extender 1-methyl-3,5-diethyl-2,4-diaminobenzene (diethyltoluene diamine) and its isomer.

Turner's U.S. Pat. No. 4,246,363 claims a RIM polyurethane composition derived from using at least three different polyols (including amine terminated polyethers) having specific relationships and reactivity and solubility parameters to one another. Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

The paper "Silane Effects and Machine Processing in Reinforced High Modulus RIM Urethane Composites," by E. G. Schwartz, et al., *Journal of Elastomers and Plastics*, volume 11 (October 1979), page 280, describes the use of silane treated milled glass fibers in reinforced RIM composites.

The article "Surface Modification for RRIM Urethanes," by Ed Galli, *Plastics Compounding*, (January/February 1982) discloses silane treated glass fiber reinforcement of RRIM urethanes. The emphasis is on amino silanes.

The publication "Silane Coupling Agents," by Dow-Corning Corporation discusses various silane coupling agents and their applications.

U.S. Pat. No. 4,474,900 discloses and claims the use of epoxy modified filler material in RIM elastomers made from high molecular weight amine terminated polyethers and/or polyols.

An advertisement and specification sheet for the product GLASSCLAD® 18 (described as a monomeric octadecylsilane derivative in a solution of t-butanol and diacetone alcohol) discloses its use as surface treatment for glass. GLASSCLAD 18 is available from Petrarch Systems of Levittown, PA.

We have found that the impact properties of reinforced reaction injection molded elastomers (RRIM) are improved by the use of octadecyltriethoxysilane believed to be the monomeric octadecylsilane derivative in GLASSCLAD 18 discussed above.

SUMMARY OF THE INVENTION

The invention is a reinforced reaction injection molded elastomer made in a closed mold ingredients comprising polyols of greater than about 500 equivalent weight and/or amine terminated polyethers of greater than 1500 average molecular weight, having greater than 50% of their active hydrogens in the form of amine hydrogens, a chain extender and an aromatic polyisocyanate, having also present additives comprising a filler and an effective amount of of a silane having the formula:

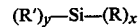

$(R')_y-Si-(R)_x$ where $x+y=4$; $R'$ is a hydrophobic moiety and $R$ is an alkoxy group, preferably methoxy or ethoxy.

DESCRIPTION OF THE PREFERRED EMBODIMENTS

The polyols useful in the process of this invention include polyether polyols, polyester diols, triols, tetrols, etc., having an equivalent weight of at least 500, and preferably at least 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

Amine terminated polyethers including primary and secondary amine terminated polyether polyols of greater than 1500 average molecular weight from 2 to 6 functionality, preferably from 2 to 3, and an amine equivalent weight from about 750 to about 4000 are useful in this invention. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

Also, mixtures of polyols and amine terminated polyethers are included within the scope of my invention.

The chain extenders useful in the process of this invention are preferably difunctional. Mixtures of difunctional and trifunctional chain extenders are also useful in this invention. Th chain extenders useful in this invention include diols, (ethylene glycol and 1,4-butane diol, for example) amino alcohols, diamines or mixtures thereof.

The aromatic diamine chain extenders useful in this invention include, for example, 1-methyl-3,5-diethyl-2,4 diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula:

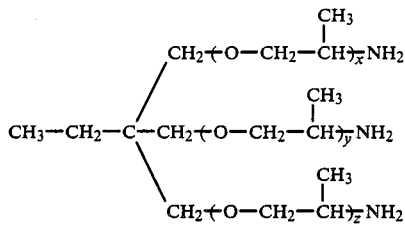

wherein $x+y+z$ has a value of about 5.3. The average amine hydrogen equivalent weight is about 67 and the product is commercially available from Texaco Chemical Company as JEFFAMINE® T-403. Another related polyoxypropylene polyamine is represented by the formula

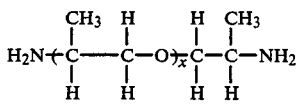

wherein $x$ has a value of about 5.6. This product has an average amine hydrogen equivalent weight of about 100 and is commercially available from Texaco Chemical Company as JEFFAMINE D-400. The product having the same formula as above wherein $x$ has an average value of about 2.6 is also useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

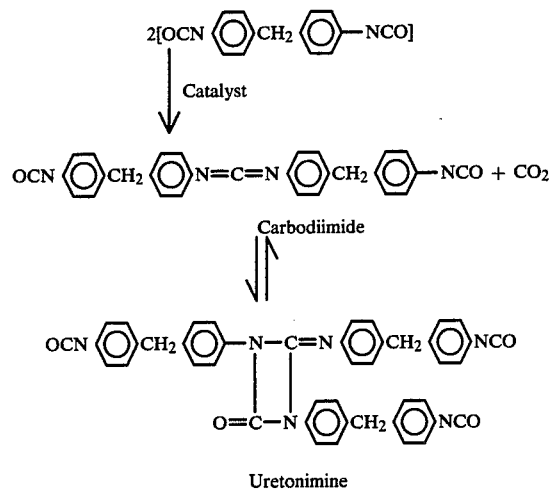

Uretonimine

Examples of commercial materials of this type are Upjohn's ISONATE ®125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

If needed, the following catalysts are useful. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

The filler materials useful in this invention are those known to be useful in RRIM elastomers. For example, flaked glass, process mineral fiber, milled glass, mica, fiberglass and Wallastonite.

The impact properties of these RRIM elastomers having incorporated therein filler materials such as those discussed above are improved by the addition to the formulation for making the RRIM product certain silane materials represented by the general structure:

$$(R')_y-Si-(R)_x$$

where $x+y=4$; R' is a hydrophobic moiety and R is an alkoxy group, preferably methoxy or ethoxy.

For example, R' may be an alkyl group, an aryl or an alkyl aryl group of hydrophobic nature. For example, the monomeric octadecyltriethoxy silane was used in the examples which follow. Other R' groups which would be hydrophobic would be apparent to those skilled in the art. One such compound would define R' as

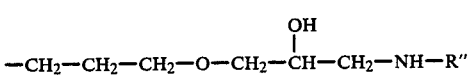

where R" is

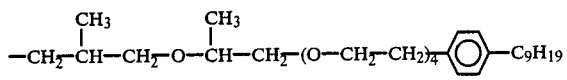

As noted above, the invention may be practiced by adding directly to the formulation for making the RIM product the silane materials just described. Alternatively, the filler used in the RRIM elastomer can be pretreated with neat silane materials noted above, or solutions of the silane materials noted above, as well as mixtures of the same. The pretreated filler can then be used in the RRIM formulation without having to add the silane material to the formulation as described previously.

The pretreated filler material can also be used in other areas such as injection molding of glass filled nylons and similar materials.

EXAMPLES 1–4

The following examples were processed on an Accuratio VR-100 two-component RIM machine. The materials were injected into a flat plaque mold measuring $18'' \times 18'' \times 0.125''$.

Example 1 is the basic technology of a RRIM system. No additive is added to it. Example 2 has the impact modifier added to the formulation. Improvement in impact can be seen from the data. Example 2 is also the first reduction to practice. The impact modifier can also be used in conjunction with other additives. Example 3 has a glass adhesion additive added to the formulation of Example 2. Example 4 has an internal mold release additive and the glass adhesion additive added to the formulation of Example 2. The composition and properties of the examples are listed in Table I. For Example 2, the impact modifier was added to the B-components: FLAKEGLAS ®, JEFFAMINE ® T-5000 amine and DETDA. This mixture was heated to 200° F. for two hours prior to using on the Accuratio RIM machine. For Example 3, the glass adhesion agent was added to the B-component in Example 2 and heated to 200° F. for two hours prior to using. For Example 4, the liquid internal mold release agent was added to the B-component in Example 3 and was not heated.

TABLE I

| | Example No. | | | |
|---|---|---|---|---|
| | 1 | 2 | 3 | 4 |
| JEFFAMINE ® T-5000 amine | 62.33 | 62.33 | 62.33 | 62.33 |
| DETDA | 27.5 | 27.5 | 27.5 | 27.5 |
| Additives: | | | | |
| Impact Modifier[1] | — | 1.0 | 1.0 | 1.0 |
| Glass Adhesion[2] | — | — | 1.0 | 1.0 |
| Internal Mold Release[3] | — | — | — | 1.0 |
| FLAKEGLAS ®[4] | 42.93 | 43.18 | 43.18 | 43.18 |
| Quasi-prepolymer[5] | 81.90 | 81.90 | 81.90 | 81.90 |
| Properties | | | | |
| Tensile strength, psi | 2530 | 2530 | 3750 | 2950 |
| Ult. Elongation, % | 35 | 110 | 35 | 41 |
| Flex. Mod., × 10000 | | | | |
| 77° F. | 17.1 | 17.4 | 16.8 | 18.2 |
| 158° F. | 11.4 | 11.7 | 12.4 | 12.8 |
| −20° F. | 30.4 | 32.9 | 31.8 | 32.3 |
| 311° F. | 10.7 | 10.8 | 10.8 | 11.3 |
| Heat sag | | | | |
| 311° F., 150 mm | 4.0 | 2.6 | 5.0 | 4.2 |
| 250° F., 150 mm | 1.2 | 1.7 | 2.9 | 2.4 |
| Izod impact | 4.4 | 7.8 | 4.3 | 4.5 |
| Rheometrics impact | | | | |
| Ult. energy, 77° F. | 60 | 110 | 90 | 110 |
| Total energy, 77° F. | 100 | 140 | 130 | 140 |

Notes:
[1] The impact modifier is octadecyltriethoxysilane.
[2] The glass adhesion additive used was 3-glycidoxypropyltrimethoxysilane.
[3] The internal mold release agent used was Q2-7119 which is a dimethyl siloxane with organic acid groups and is a product of Dow-Corning Corp.
[4] FLAKEGLAS ® is 1/64 inch flakeglass from Owens/Corning.
[5] ISONATE ® 143L with 1 pbw THANOL ® SF-5505 (a 5500 molecular weight polyether triol containing approximately 80% primary hydroxyl groups; a product of Texaco Chemical Co.).

From the data in Table I, the improvement can be seen. Izod impact is improved over the base case, Example 1. The rheometrics impact data also shows improvement in ultimate energy and total energy. The advantage of the impact modifier is also demonstrated when other known additives to a RIM system are present such as a glass adhesion agent and an internal mold release agent.

I claim:

1. A reaction injection molded elastomer made by reacting in a closed mold ingredients comprising amine terminated polyethers of greater than 1500 average molecular weight, having greater than 50% of their active hydrogens in the form of amine hydrogens, a chain extender and an aromatic polyisocyanate having also present an additive comprising a filler and the silane compound octadecyltriethoxysilane.

2. A reaction injection molded elastomer made by reacting in a closed mold ingredients comprising amine terminated polyethers of greater than 1500 average molecular weight, having greater than 50% of their active hydrogens in the form of amine hydrogens, a chain extender and an aromatic polyisocyanate having also present an additive comprising a filler and a silane compound of the formula:

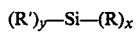

where x+y=4; R' is a group of the general formula:

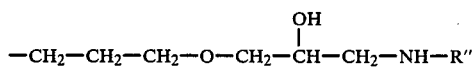

where R'' is

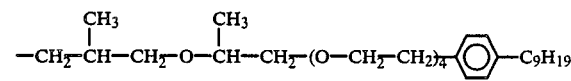

and R is an alkoxy group, preferably methoxy or ethoxy.

3. A reaction injection molded elastomer made by reacting in a closed mold ingredients comprising a polyether polyol having an equivalent weight of at least 500, a chain extender and an aromatic polyisocyanate having also present an additive comprising a filler and octadecyltriethoxysilane.

4. A reaction injection molded elastomer made by reacting in a closed mold ingredients comprising a polyether polyol having an equivalent weight of at least 500, a chain extender and an aromatic polyisocyanate having also present an additive comprising a filler and a compound of the formula:

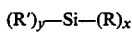

where x+y=4; R' is a group of the general formula:

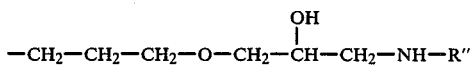

where R'' is

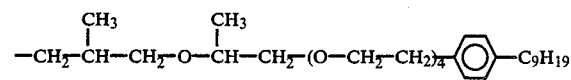

and R is an alkoxy group, preferably methoxy or ethoxy.

* * * * *